United States Patent [19]

Utsui et al.

[11] Patent Number: 5,301,111
[45] Date of Patent: Apr. 5, 1994

[54] SUSPENSION APPARATUS FOR A VEHICLE

[75] Inventors: Yoshihiko Utsui; Masahiro Tado; Hidehiko Sugimoto, all of Amagasaki; Shunichi Wada, Himeji, all of Japan

[73] Assignee: Mitsubishi Denki Kabushiki Kaisha, Tokyo, Japan

[21] Appl. No.: 7,814

[22] Filed: Jan. 22, 1993

Related U.S. Application Data

[63] Continuation of Ser. No. 564,504, Aug. 8, 1990, abandoned.

[30] Foreign Application Priority Data

| Nov. 29, 1989 | [JP] | Japan | 1-307598 |
| Nov. 29, 1989 | [JP] | Japan | 1-307599 |
| Nov. 29, 1989 | [JP] | Japan | 1-307600 |
| Dec. 6, 1989 | [JP] | Japan | 1-315463 |

[51] Int. Cl.$^5$ .......................... B60G 17/015
[52] U.S. Cl. .................. 364/424.05; 280/707
[58] Field of Search ............ 364/424.05; 280/707, 280/840, 711

[56] References Cited

U.S. PATENT DOCUMENTS

| 4,897,776 | 1/1990 | Urababa et al. | 280/707 |
| 4,900,054 | 2/1990 | Kessler | 280/707 |
| 4,934,731 | 6/1990 | Hiwatashi et al. | 280/711 |
| 4,981,309 | 1/1991 | Froeschle et al. | 280/707 |
| 5,028,073 | 7/1991 | Harms et al. | 280/707 |
| 5,044,455 | 9/1991 | Tecco et al. | 280/707 |
| 5,060,959 | 10/1991 | Davis et al. | 280/707 |
| 5,071,159 | 12/1991 | Kamimira et al. | 280/707 |
| 5,083,275 | 1/1992 | Kawagoe et al. | 364/424.05 |

Primary Examiner—Gary Chin
Attorney, Agent, or Firm—Sughrue, Mion, Zinn, Macpeak & Seas

[57] ABSTRACT

An improved support apparatus such as a suspension apparatus for a vehicle is disclosed which has excellent response characteristics, can save power consumption and has excellent vibration-isolating capacity for isolating the transmission of high-frequency vibrations from a support member such as a road wheel to an object such as the body of a vehicle. To these end, in one embodiment, a linear motor is disposed between the object and the support member for telescopically supporting the object under magnetic effects. A position sensor senses the position of the object relative to a reference position. A low-pass filter filters high-frequency components of the output signal of the position sensor above a prescribed upper frequency limit. Based on the output signals of the position sensor and the low-pass filter, the current supply to the linear motor is controlled in such a manner as to offset a change in the output signal of the low-pass filter. In another embodiment, an elastic member is further disposed between the object and the support member in parallel with the linear motor for elastically supporting the object on the support member. A high-pass filter filters low-frequency components of the output signal of the position sensor below a prescribed lower frequency limit. Based on the output signal of the high-pass filter, a correction is calculated for offsetting a change in the operating force of the elastic member. The current supply to the linear motor is controlled based on a change in the output signal of the low-pass filter and the correction thus calculated.

8 Claims, 8 Drawing Sheets

SUSPENSION APPARATUS FOR A VEHICLE

This is a continuation of application Ser. No. 07/564,504 filed Aug. 8, 1990, now abandoned.

BACKGROUND OF THE INVENTION

The present invention relates to a support apparatus as a suspension apparatus for an internal combustion engine and the like for dampingly supporting an object on a support member. More particularly, it relates to such a support apparatus which has an improved vibration-absorbing characteristic in which transmission of high-frequency vibrations from the support member to the object can be effectively absorbed.

A typical example of a conventional support or suspension apparatus for a vehicle is shown in FIG. 8. In this FIG., the body 1 of a vehicle displaceably supports four axle shafts 2 (only one is illustrated), and a road wheel 3, being rotatable on the ground or the road, is fixedly mounted on a corresponding axle shaft 2. Each road wheel 3, acting as a support member, supports the vehicle body 1, acting as an object to be supported, through a support apparatus in the form of a well-known suspension apparatus S. The suspension apparatus S illustrated includes a shock absorber 5 such as an oil damper connected between the vehicle body 1 and the axle shaft 2 for absorbing and suppressing vibrations of the vehicle body 1, and a coiled spring 6 disposed under compression between a slidable member and a fixed member of the shock absorber 5.

The operation of the above conventional suspension apparatus S will now be described with reference to FIG. 9 which illustrates the vibration response characteristic of the vehicle body 1.

If the road surface 4, on which the vehicle is travelling, is irregular, the road wheel 3 is caused to move up and down, thus generating vibrations in the vertical direction. The vibrations of the road wheel 3 are transmitted to the vehicle body 1 through the suspension apparatus S, i.e., through the shock absorber 5 and the coiled spring 6. In this case, the vibration response characteristic of the vehicle body 1 in relation to the vibration frequency f due to the road surface irregularities is shown in FIG. 9.

In FIG. 9, the ordinate represents the ratio of the vibration amplitude of the vehicle body 1 to the magnitude or height of the road surface irregularities, and the abscissa represents the vibration frequency f of the road wheel 3. Also, the broken line, the solid line and the chain-dotted line represent different characteristic curves which are obtained by changing the damping force of the shock absorber 5 into a low, a medium and a high level, respectively. In addition, $f_1$, $f_2$ and A indicate the resonance frequency of the sprung portion or the vehicle body 1, the resonance frequency of the unsprung portion or the road wheel 3, and the discomfortable range of the vibration frequency in which the driver or passenger of the vehicle feels discomfort, respectively.

From FIG. 9, the following facts are shown.

(I) When the damping force of the shock absorber 5 is low or small, the vibration response of the vehicle body 1 (i.e., vibration of the vehicle body 1 responsive to that of the road wheel 3) is low in the discomfortable range A, but the amplitude of vibration of the vehicle body 1 at the resonance frequency $f_1$ is great, as shown by the broken line. As a result, if the road wheel 3 rides on a projection or the like on the road, the resultant vibrations of the vehicle body 1, which ordinarily have vibration frequencies near the resonance frequency $f_1$, are not attenuated or converged by the shock absorber 5 in a short time, so the attitude of the vehicle body 1 remains unstable for a relatively longer period of time, impairing the riding comfort.

(II) When the damping force of the shock absorber 5 is great, there is substantially no resonance point in the vibration frequency so that the attenuation or convergence of vibrations of the vehicle body 1 in the relatively low frequency range is materially improved. In this case, however, the vibration response of the vehicle body 1 in the discomfortable range A increases, thus resulting in decreased riding comfort.

Accordingly, in view of the riding comfort and the running stability of the vehicle, a compromise is made so that the damping force of the shock absorber 5 is set to be at a medium level between the small and the large level (I) and (II), as shown by the solid line in FIG. 9.

Next, the strength of the coiled spring 6 is considered. For example, a pitching moment will be applied to the vehicle body 1 as when the vehicle is braked, decelerated, or accelerated, and a rolling moment will be applied to the vehicle body 1 as when the vehicle is steered to turn. On these occasions, in order to maintain the attitude of the vehicle body 1 unchanged or at level against such a pitching and/or rolling moment, it is necessary to stiffen the coiled spring 6, i.e., to increase its spring constant k. However, as the spring constant k becomes greater, the resonance frequency $f_1$ of the vehicle body 1 approaches the discomfort range A, thus impairing the riding comfort.

Consequently, for the purpose of coping with the above-described problem of reduced riding comfort, it is considered that the spring constant k of the coiled spring 6 be decreased and at the same time the damping force of the shock absorber 5 be set in such a manner as to change along the lowermost line in FIG. 9, i.e., to satisfy the following conditions:

1) The damping force is set to a high level if the vibration frequency f is less than the discomfortable range A (f<A).
2) The damping force is set to a low level if the vibration frequency f falls within the discomfortable range A (f=A).
3) The damping force is set to a medium level if the vibration frequency f is greater than the discomfortable range A (f>A).

It is, however, extremely difficult to change the damping force of the hydraulic shock absorber 5 such as an oil damper in the above manner depending upon the vibration frequency f because of the hydraulic nature thereof.

Furthermore, in order to decrease the strength of the coiled spring 6, some countermeasure must be taken for stabilizing the attitude of the vehicle body 1. To this end, for example, the coiled spring 6 may be replaced by a known pneumatic spring or the like, the spring constant k of which can be changed by controlling the quantity and/or flow of gas such as air filled therein. In this case, however, the response of the pneumatic spring is poor.

Moreover, it is considered that the shock absorber 5 is replaced by a hydraulic actuator, and that the thrust or operating force of the hydraulic actuator is controlled such that the cushioning force of the coiled spring 6 acting against the high-frequency vibrations of the unsprung portion or the road wheel 3 is offset by the hydraulic actuator while maintaining the height or attitude of the vehicle at a constant target level. In this case, however, a hydraulic actuator is generally superior in response to a pneumatic actuator, but a hydraulic fluid employed therewith is non-compressible, so there is the drawback that high-frequency vibrations of the road wheel 3 tend to be directly transmitted through the hydraulic actuator to the vehicle body 1.

Thus, the above-described conventional suspension apparatues generally have the problem that the vibration-absorbing capacity is relatively low, so vehicles equipped with such suspension apparatuses are poor in riding comfort.

SUMMARY OF THE INVENTION

Accordingly, the present invention is intended to obviate the above-described problems of the conventional suspension apparatus for a vehicle.

It is an object of the present invention to provide an improved support apparatus for general purposes or an improved suspension apparatus for a vehicle which has excellent vibration-absorbing capacity for absorbing or isolating the transmission of high-frequency vibrations from a support member such as a road wheel to an object such as the body of a vehicle.

Another object of the present invention is to provide an improved support apparatus for general purposes or an improved suspension apparatus for a vehicle which has an excellent response characteristic.

A further object of the present invention is to provide an improved support apparatus for general purposes or an improved suspension apparatus for a vehicle which is able to save power consumption.

According to one aspect of the present invention, there is provided a support apparatus for dampingly supporting an object on a support member, the support apparatus comprising:

a linear motor disposed between the object and the support member for telescopically supporting the object under magnetic effects, the linear motor having a stator member and a movable member which is movable relative to the stator member, the movable member being magnetically connectable with the stator member, one of the stator member and the movable member being connected to the object, the other of the stator member and the movable member being connected to the support member;

a position sensor for sensing the position of the object relative to a reference position and generating an output signal representative of the sensed relative position of the object;

a low-pass filter for filtering high-frequency components of the output signal of the position sensor above a prescribed upper frequency limit; and current control means for controlling, based on the output signals of the position sensor and the low-pass filter, the current supply to the linear motor in such a manner as to offset a change in the output signal of the low-pass filter.

According to another aspect of the present invention, there is provided a support apparatus for dampingly supporting an object on a support member, the support apparatus comprising:

a linear motor disposed between the object and the support member for telescopically supporting the object under magnetic effects, the linear motor having a stator member and a movable member which is movable relative to the stator member, the movable member being magnetically connectable with the stator member, one of the stator member and the movable member being connected with the object, the other of the stator and the movable member being connected with the support member;

an elastic member disposed between the object and the support member in parallel with the linear motor for elastically supporting the object on the support member;

a position sensor for sensing the position of the object relative to a reference position and generating an output signal representative of the sensed relative position of the object;

a low-pass filter for filtering high-frequency components of the output signal of the position sensor above a prescribed upper frequency limit;

a high-pass filter for filtering low-frequency components of the output signal of the position sensor below a prescribed lower frequency limit;

correction calculating means for calculating, based on the output signal of the high-pass filter, a correction for offsetting a change in the operating force of the elastic member; and current control means for controlling the current supply to the linear motor based on a change in the output signal of the low-pass filter and the correction calculated by the correction calculating means.

According to a further aspect of the present invention, there is provided a suspension apparatus for a vehicle for dampingly supporting a vehicle body on a road wheel, the suspension apparatus comprising:

a linear motor disposed between the vehicle body and the road wheel for telescopically supporting the vehicle body under magnetic effects, the linear motor having a stator member and a movable member which is movable relative to the stator member for telescopic movement, the movable member being magnetically connectable with the stator member, one of the stator member and the movable member being connected to the vehicle body, the other of the stator and the movable member being connected to the road wheel;

an elastic member disposed between the vehicle body and the road wheel in parallel with the linear motor for elastically supporting the vehicle body on the road wheel;

first sensor means for sensing the various dynamic conditions of the vehicle body, the first sensor means including a height sensor for sensing the height of the vehicle body relative to the road wheel;

second sensor means for sensing the various operating conditions of the road wheel; and control means for controlling the current supply to the linear motor based on the output signals from the first and second sensor means in such a manner that the linear motor operates to isolate the transmission of high-frequency vibrations of the road wheel to the vehicle body while maintaining the height of the vehicle body at a target level.

Preferably, the control means comprises:

a low-pass filter for filtering high-frequency components of the output signal of the height sensor above a prescribed upper frequency limit;

a high-pass filter for filtering low-frequency components of the output signal of the height sensor below a prescribed lower frequency limit;

correction calculating means for calculating, based on the output signal of the high-pass filter, a correction for offsetting a change in the operating force of the elastic member;

attitude control means for calculating a height control value representative of a target vehicle height based on the output signals from the first and second sensors; and an adder for doing an addition of the correction from the correction calculating means and the height control value from the attitude control means, and generating an output signal representative of the result of the addition; and current control means for controlling the current supply to the linear motor based on the outputs of the low-pass filter, the output of the adder and the output of the height sensor.

According to a yet further aspect of the present invention, there is provided a suspension apparatus for a vehicle for dampingly supporting a vehicle body on road wheels, the suspension apparatus comprising:

a plurality of linear motors each disposed between the vehicle body and one of the road wheels for telescopically supporting the vehicle body under magnetic effects, the linear motor having a stator member and a movable member which is movable relative to the stator member for telescopic movement, the movable member being magnetically connectable with the stator member, one of the stator member and the movable member being connected with the vehicle body, the other of the stator and the movable member being connected with the corresponding road wheel;

a plurality of elastic members each disposed between the vehicle body and one of the road wheels in parallel with a corresponding one of the linear motors for elastically supporting the vehicle body on the corresponding road wheel;

a plurality of height sensors provided one for each road wheel for sensing the height of the vehicle body relative to the corresponding road wheel;

first sensor means for sensing the dynamic conditions of the vehicle body;

second sensor means for sensing the various operating conditions of the vehicle; and vehicle-attitude control means for generating, based on the output signals of the first and second sensor means, vehicle-attitude control signals representative of a target attitude of the vehicle body relative to the road wheels;

thrust control means for controlling the thrust of each of the linear motors based on the output signals from the height sensors and the vehicle-attitude control means in such a manner that each of the linear motors operates to isolate the transmission of high-frequency vibrations of the corresponding road wheel to the vehicle body while maintaining the attitude of the vehicle body at the target attitude; and current control means for controlling the current supply to the respective linear motors based on the output signals from the thrust control means.

In one form, the thrust control means comprises:

height control means for calculating, based on the output signal of each height sensor and the vehicle-attitude control means, an appropriate thrust of each linear motor so that the heights of the vehicle body relative to the respective road wheels are controlled by the linear motors to maintain the vehicle attitude at the target attitude; and vibration-isolating control means for calculating, based on the output signal of each height sensor, an appropriate thrust for each linear motor so that the high-frequency vibrations of each road wheel are offset by the corresponding linear motor to isolate the transmission of the vibrations to the vehicle body.

Preferably, the height control means comprises:

a high-pass filter for filtering low-frequency components of the output signal of each height sensor below a prescribed lower frequency limit; and correction calculating means for calculating, based on the output signal of the high-pass filter, a correction for offsetting a change in the operating force of each elastic member.

Preferably, the vibration-isolating means comprises a low-pass filter for filtering high-frequency components of the output signal of each height sensor above a prescribed upper frequency limit.

In another form, the thrust control means comprises:

a high-pass filter for filtering low-frequency components of the output signal of each height sensor below a prescribed lower frequency limit;

correction calculating means for calculating, based on the output signals of the high-pass filter and each height sensor, a correction for offsetting a change in the operating force of each elastic member;

a low-pass filter for filtering high-frequency components of the output signal of each height sensor above a prescribed upper frequency limit; and current calculating means for calculating, based on the output signals of the vehicle-height control means, the height sensors, the correction calculating means and the low-pass filter, control current values representative of currents which are respectively supplied to the linear motors, the current calculating means being operable to output the control current values to the current control means.

The above and other objects, features and advantages of the present invention will become more readily apparent from the following detailed description of a few preferred embodiments of the invention taken in conjunction with the accompanying drawings.

DESCRIPTION OF THE PREFERRED EMBODIMENTS

The present invention will now be described in detail with reference to a few preferred embodiments as illustrated in the accompanying drawings.

Figure 1:
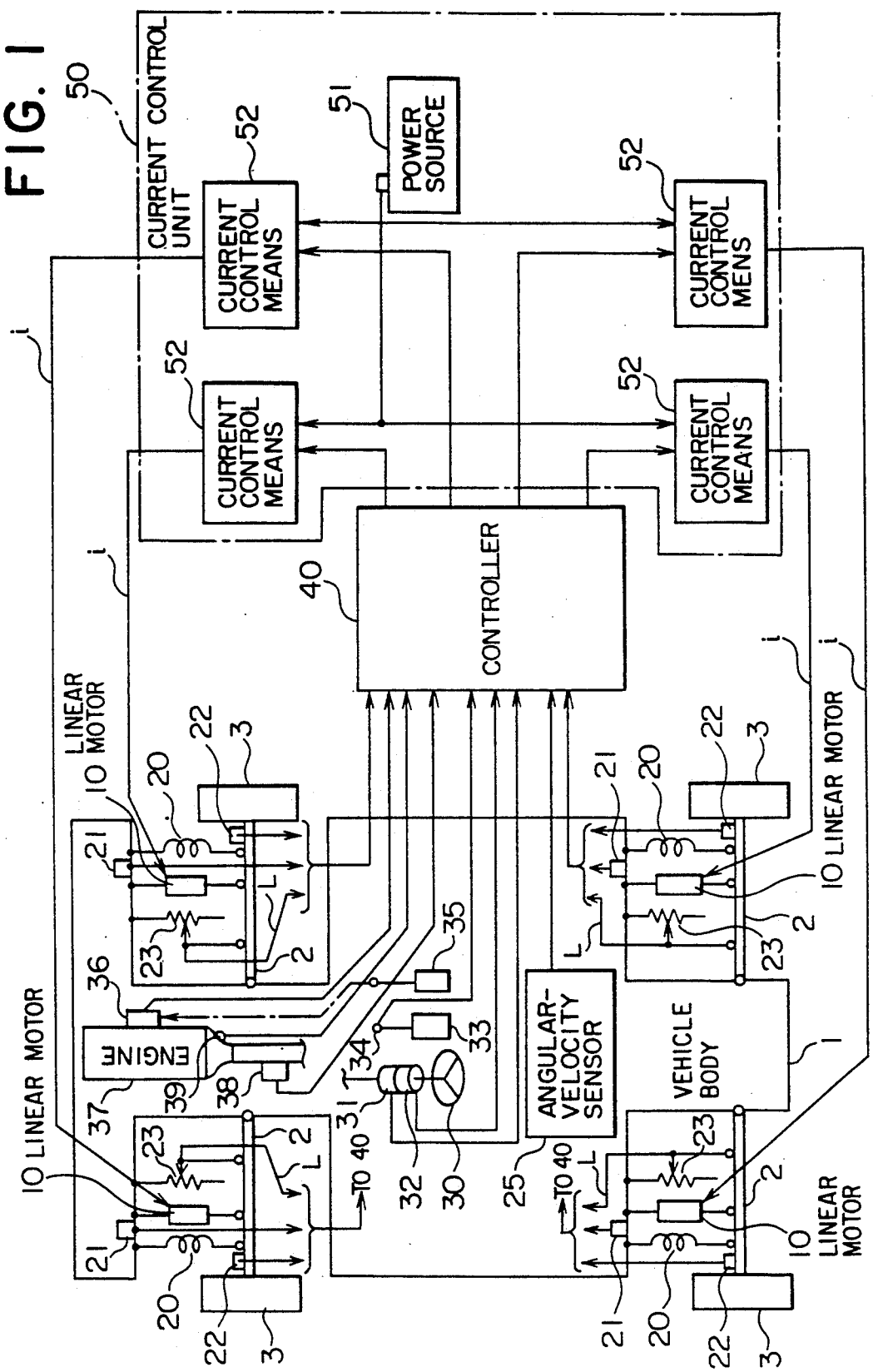
FIG. 1 is a schematic illustration showing the general arrangement of a support apparatus in the form of a suspension apparatus for a vehicle in accordance with a first embodiment of the present invention.
Figure 2:
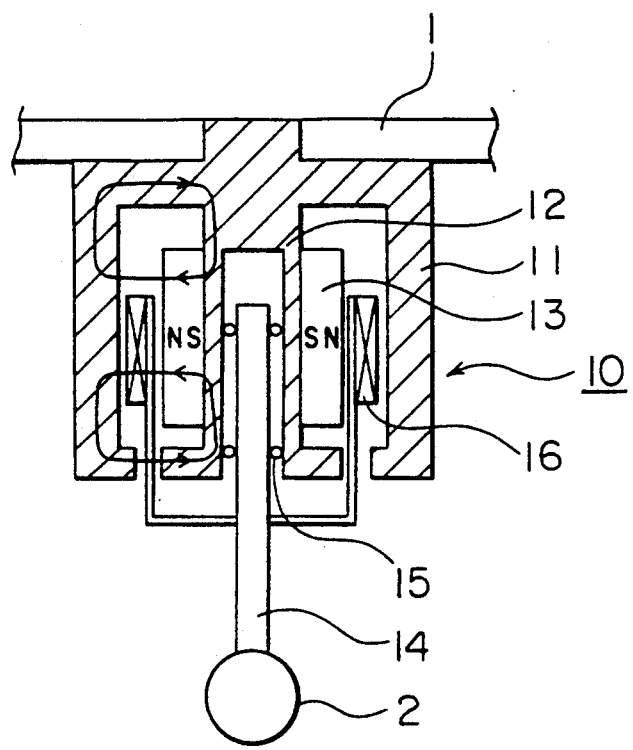
FIG. 2 is a cross section of a linear motor of FIG. 1.
Figure 3:
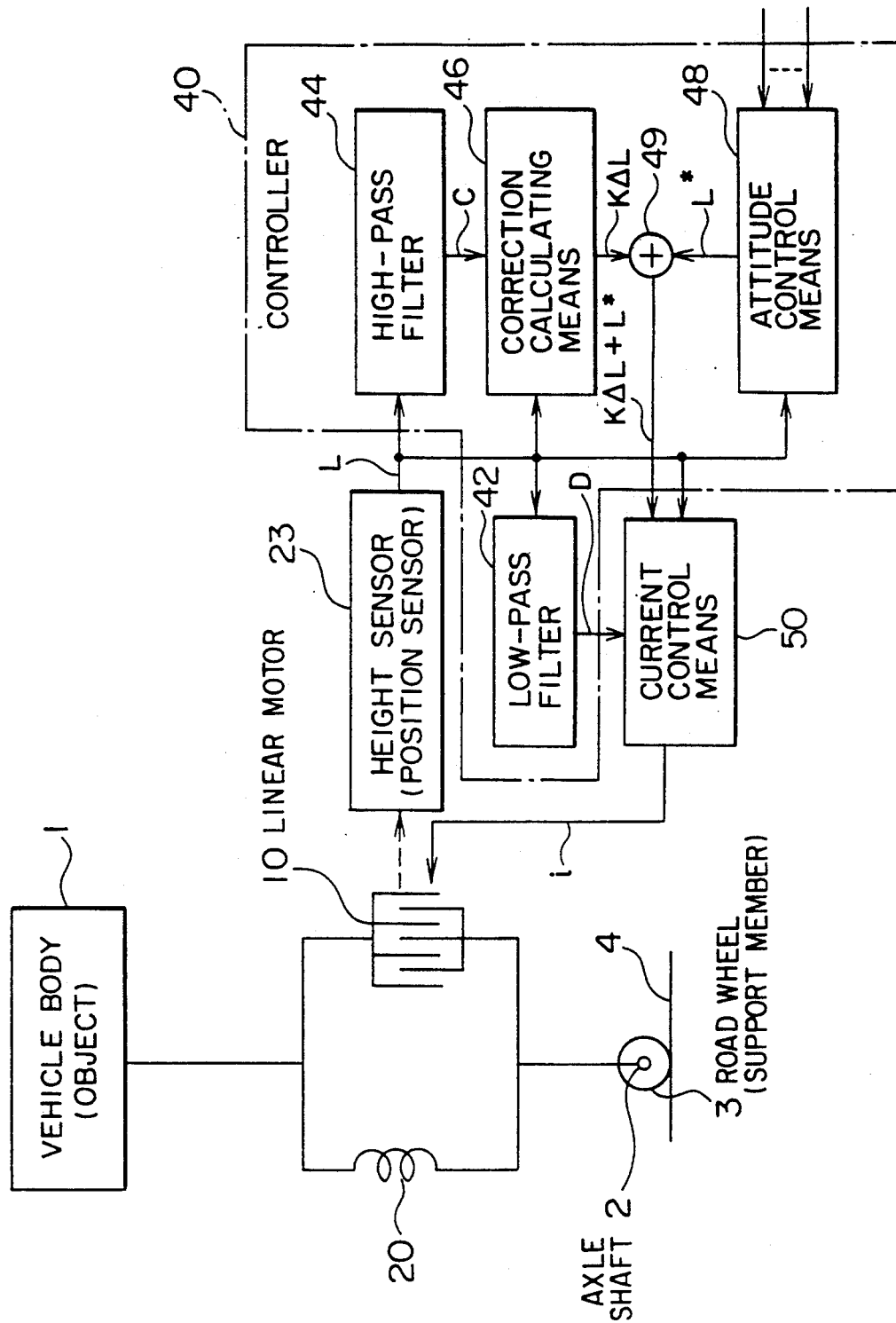
FIG. 3 is a block diagram of a controller for controlling the linear motor of FIG. 2.

Referring to the drawings and first to FIGS. 1 through 3, there is illustrated a support apparatus for damplingly supporting an object on a support member in accordance with a first embodiment of the present invention. In this embodiment, the support apparatus is applied to a suspension apparatus for a vehicle. In FIG. 1, the body 1 of a vehicle such as an automobile displaceably supports four axle shafts 2 on each of which a road wheel 3 is fixedly mounted. In this case, the vehicle body 1 acts as an object to be supported, and the road wheels 3 as a support member. Disposed between the vehicle body 1 and each of the axle shafts 2 is a suspension apparatus of the present invention which comprises a linear motor 10 and an elastic member 20 in the form of a mechanical coiled spring or the like both arranged in parallel with each other. The linear motor 10 and the elastic member 20 have one end connected to a corresponding axle shaft 2 and the other end connected to the vehicle body 1.

As clearly shown in FIG. 2, the linear motor 10 is in the form of a voicecoil type electromagnetic actuator which includes an outer cylindrical yoke 11, and an inner cylindrical yoke 12 disposed inside and integrally formed at its one end with the outer yoke 11 so as to provide, together with the outer yoke 11, a coaxial double cylindrical configuration. A plurality of permanent magnets 13 are disposed around and radially secured under magnetic attraction to the outer circumferential surface of the inner cylindrical yoke 12. Thus, the outer and inner cylindrical yokes 11, 12 and the permanent magnets 13 together form a stator in which the permanent magnets 13 produce magnetic fluxes passing through the inner and outer yokes 12, 11 to form closed loop magnetic fields. A slide member 14 in the form of an output shaft is slidably inserted in the inner cylindrical yoke 12 and slidably supported therein through a slide bearing 15 for movement therealong in the vertical direction in FIG. 2. A voice coil or cylindrical electromagnet 16 fixedly supported by the slide member 14 is disposed in an annular space between the permanent magnets 13 and the outer cylindrical yoke 11 so that it is magnetically connected with the stator.

Reverting now to FIG. 1, a pair of first and second acceleration sensors 21, 22 are provided for each suspension apparatus. The first acceleration sensor 21 is mounted on the vehicle body 1 for sensing the acceleration thereof, and the second acceleration sensor 22 is mounted on the axle shaft 2 for sensing the acceleration thereof. A position sensor 23 in the form of a height sensor provided for each suspension apparatus is mounted between each axle shaft 2 and a corresponding portion of the vehicle body 1 for sensing the position of the vehicle body 1 and a corresponding road wheel 3 (i.e., the height or vertical distance of that portion of the vehicle body 1 relative to the axle shaft 2). The height sensor 23 may be comprised of a differential transformer and a potentiometer.

Also, provisions are made for a yaw rate sensor 25 for sensing the yaw rate or angular velocity of the vehicle body 1, a steering angle sensor 31 for sensing the steering angle of a steering wheel 30, a steering angular velocity sensor 32 for sensing the angular velocity of the steering wheel 30, a brake sensor 34 for sensing the application of a brake device 33, an accelerator pedal sensor 36 for sensing the amount of operation or depression of an accelerator pedal 35, a speed sensor 38 for sensing the speed of the vehicle based on the number of revolutions per minute of the output shaft of an unillustrated transmission gear, and a clutch sensor 39 for sensing the speed change operation of the unillustrated transmission due to an unillustrated clutch. Among these sensors, the acceleration sensor 21, 22, the height sensor 23, the yaw rate sensor 25 and the speed sensor 38 together constitute a first sensor means for sensing the dynamic conditions of the vehicle body 1. The steering angle sensor 31, the steering angular velocity sensor 32, the brake sensor 34, the accelerator pedal sensor 36 and the speed change sensor 39 together constitute a second sensor means for sensing the operating condition of the vehicle.

A controller 40 receives the output signals from all the above sensors, calculates, based thereupon, the optimal control attitude of the vehicle body 1 and generates height control signals for respectively controlling the heights of the vehicle body 1 relative to the respective axle shafts 2 based on the optimal vehicle attitude thus calculated.

A current control unit 50 receives the output signals from the controller 40 for controlling the current supply to the respective linear motors 10. The current control unit 50 includes a power supply 51, and four current supply means 52 provided one for each linear motor 10 for respectively controlling the current supply from the power source 51 to the corresponding linear motor 10.

FIG. 3 schematically shows a more detailed arrangement of the controller 40 along with its related elements. In this Figure, the controller 40 includes a low-pass filter 42 for filtering the high-frequency oscillating components of the output signal from each height sensor 23, which have frequencies above a prescribed upper limit (i.e., frequencies which fall within the discomfortable frequency range in which the driver or passenger feels discomfort), a high-pass filter 44 for filtering the low-frequency oscillating components of the output signal from each height sensor 23, which have frequencies below a prescribed lower limit, a correction calculating means 46 for calculating a correction $k \times \Delta L$ for offsetting the operating or cushioning force of each elastic member 20 in response to the output C of the high-pass filter 44, an attitude control means 48 for calculating height control values L* (i.e., a target vehicle height or attitude) based on the output signals from the various sensors, and an adder 49 for adding the correction $k \times \Delta L$ and the height control values L* and generating an output signal representative of the result of addition $(k \times \Delta L + L^*)$. Of these elements of the controller 40, the low-pass filter 42 constitutes a height control means for controlling the height of the vehicle body 1 relative to the respective axle shafts 2 so as to maintain the vehicle attitude at a target attitude, and the high-pass filter 44 and the correction calculating means 46 together constitute a vibration isolating means for isolating the transmission of non-controlled high-frequency vibrations from the road wheels 3 to the vehicle body 1. Thus, the current control means 50 controls the current i supplied to each linear motor 10 in such a manner that the current i offsets a change in the output D of the low-pass filter (i.e., low-frequency components of the height sensor output) during the vehicle-height control operation in which the vehicle height or attitude is controlled to be at a constant target level, and that the current i is controlled based on the output signal ($k \times \Delta L + L^*$) of the adder 49 during the vibration-isolating control operation in which the transmission of high-frequency vibrations from the road wheels 3 to the vehicle body 1 is isolated.

The operation of this embodiment as illustrated in FIGS. 1 through 3 will now be described.

When the linear motors 10 are in a vibration isolating mode in which the linear motors 10 are subject to no control vibrations, the currents i supplied from the current control means 50 to the respective linear motors 10 are constant so that the linear motors 10 respectively produce a constant operating force or thrust. Under this condition, if a road wheel 3 is caused to vibrate and non-controlled vibration of a high frequency above the prescribed upper limit is to be transmitted from the road wheel 3 to the vehicle body 1 through the corresponding axle shaft 2, the linear motor 10 and the elastic member 20, the changed or high-frequency component of the output signal D of the corresponding height sensor 23 due to a change in the height L of the vehicle body 1 relative to the axis shaft 2 (hereinafter abbreviated as the relative vehicle height L) is filtered by the low-pass filter 42 and hence is not inputted to the current control means 50. On the other hand, the changed high-frequency component of the output of the height sensor 23 due to a change in the relative vehicle height L is inputted through the high-pass filter 44 to the correction calculating means 46 where a correction $k \times \Delta L$ is calculated so as to offset the operating or cushioning force of the elastic member 20.

Here, a change (or displacement) $\Delta L$ in the relative vehicle height L is expressed as follows;

$$\Delta L = L_2 - L_1$$

where $L_1$ is the initial relative vehicle height, and $L_2$ is the displaced relative vehicle height.

The correction calculating means 46 calculates the correction $k \times \Delta L$ based on the predetermined spring constant k and the displacement $\Delta L$ of the elastic member 20 using the following formula:

$$k \times \Delta L = k \times (L_2 - L_1).$$

The correction $k \times \Delta L$ thus determined is added by the adder 49 to the height control value $L^*$ (the target vehicle height) from the attitude control means 48, and then inputted to the current control means 50. At this time, the current i supplied from the current control means 50 to the linear motor 10 is expressed as follows:

$$\begin{aligned} i &= io + k \times \Delta L + L^* - L \\ &= io + k \times (L_2 - L_1) + L^* - L \end{aligned}$$

where io is the constant current supply when there is no vibration of the vehicle body 1. In this regard, the height control value $L^*$ from the attitude control means 48 is set depending upon the various driving conditions of the vehicle and the dynamic or moving conditions of the vehicle body 1.

Accordingly, in this condition, the high-frequency vibration of the elastic member 20 transmitted from the corresponding road wheel 3 is offset or suppressed by the counteracting operation of the corresponding linear motor 10 so that the vehicle body 1 does not follow at all the non-controlled high-frequency vibrations of the road wheel 3. As a result, the absolute height of the vehicle body 1 from ground or the road surface is controlled to be at a constant level by the linear motors 10 in combination with the elastic members 20.

Next, the case is considered in which non-controlled vibrations are to be transmitted from the road wheels 3 to the vehicle body 1 as when the vehicle goes up a hill. In this case, a height sensor 23 senses the relative vehicle height L (the vertical distance between the vehicle body 1 and the corresponding axle shaft 2) from a sliding distance or stroke of the corresponding linear motor 10, and the low-pass filter 42 outputs to the current control means 50 the low-frequency changing component D of the relative vehicle height L below the prescribed lower limit. The current control means 50 determines, based on the low-frequency changing component of the output signal D from the low-pass filter 42, the magnitude of current i to be supplied to the linear motor 10, and controls the motor 10 in such a manner as to offset the changing component D of the relative vehicle height L. On this occasion, there is no output C from the high-pass filter 44, and hence the correction calculating means 46 remains inoperative so that the output of the adder 49 is only the height control value $L^*$ from the attitude control means 48. As a result, the supply current i to the linear motor 10 is expressed as follows:

$$i = io + L^* - L.$$

Thus, the vehicle body 1 is moved in accordance with the low-frequency changing component D of the relative vehicle height L so as to maintain the relative height L of the vehicle body 1 at a constant level. Also, when the load on the linear motors 10 is caused to change due, for example, to the changed weight of the vehicle, the relative vehicle height L changes with a low frequency so that the vehicle body 1 is moved so as to offset the changed component D of the relative vehicle height L, thus maintaining the constant vehicle height L, as in the above case of the vehicle ascending uphill.

Consequently, the vehicle body 1 is supported on the road wheels 3 through the suspension apparatuses, each of which is composed of the linear motor 10 and the elastic member 20, such that the heights or distances L of the vehicle body 1 relative to the axle shafts 2 are held constant, while permitting the vehicle body 1 to follow the low-frequency change in the vehicle height including controlled vibrations. Thus, even if the relative height of the axle shaft 2 from ground is caused to change as when the vehicle travels on an upward slope or if the load on the linear motor 10 changes due to variations in the vehicle weight, the vehicle body 1 will always be supported by the linear motors 10 in combination with the elastic members 20.

In this connection, it will be understood that the linear motors 10, generating an operating force or thrust through the action of electromagnetic fields transmitted in a space irrespective of sliding motions of the linear motors 10 (i.e., irrespective of the relative position between the slide member and the stator of each linear motor), can provide a constant supporting force to the vehicle body 1 even with a change in the height of each axle shaft 2. In other words, the linear motors 10 have a characteristic of completely isolating the transmission of non-controlled or natural vibrations between the road wheels 3 and the vehicle body 1. In addition, the thrust or operating force of each linear motor 10 is controlled to develop and disappear by the turning on and off of the current supply thereto, so the switch-over response of the linear motors 10 is extremely quick, enabling the effective vibration-damping control as well as the vehicle-attitude stabilizing and constant-height maintaining control for the vehicle body 1 to be effected in a most swift and effective manner. As a result, it is possible to realize an automotive suspension apparatus which has excellent high-frequency vibration isolating or aborbing capability as well as absolute vehicle-height stabilizing capability for the vehicle body 1. Further, the suspension apparatus of this embodiment, operating to offset the changed component D of the relative vehicle height L during the vehicle-height control mode, has high vehicle-attitude controlling capability as well. Furthermore, a major portion of the vehicle weight is supported by the elastic members 20 so that the linear motors 10 are substantially relieved of such weight-supporting function but instead only have to perform the vehicle-attitude controlling function and the vibration damping and isolating function, thus requiring very limited power consumption and providing for considerable power savings.

In this manner, the operating force of each linear motor 10 is controlled independently of the various vibrations of the corresponding axle shaft 2 in such a manner that the vehicle body 1 is non-sensitive to the non-controlled high-frequency vibrations of the road wheels 3 but sensitive to the low-frequency vibrations or gradual changes in height of the road wheels 3. This is most effective to prevent the vibrations of the road wheels 3 with frequencies within a particular frequency range, which are discomfortable to a driver or passenger from being transmitted to the vehicle body 1.

Figure 4:
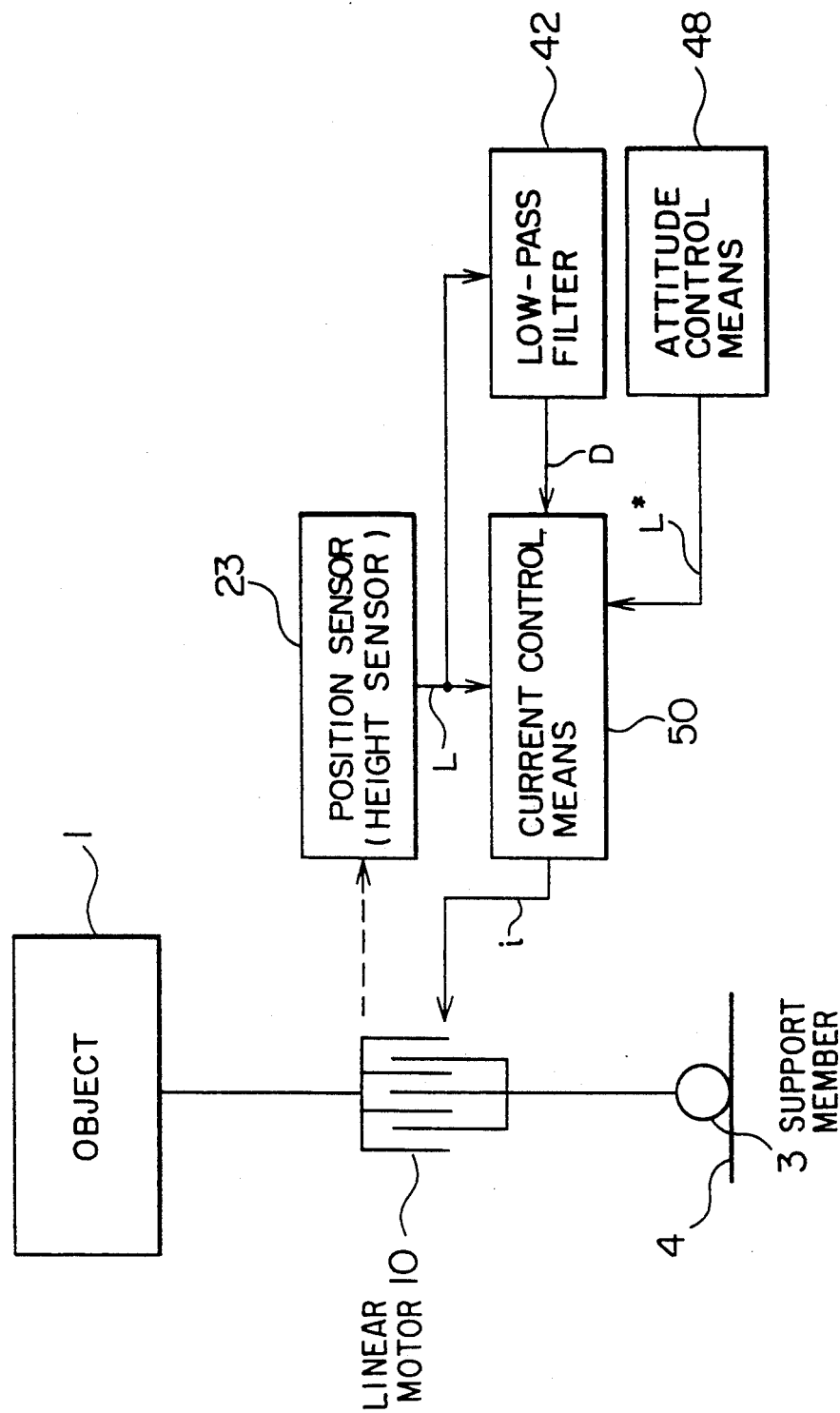
FIG. 4 is block diagram similar to FIG. 3, but showing a support apparatus in accordance with a second embodiment of the present invention.

FIG. 4 shows a second embodiment of the present invention which is much simpler in construction and operation than the previously described first embodiment of FIGS. 1 through 3. In particular, this embodiment is advantageously applied to a support apparatus for general purposes for dampingly supporting an object on a support member. This embodiment is different in construction from the previous embodiment in the following manner. Specifically, in this embodiment, the elastic members 18 are omitted, and the high-pass filter 44, the correction means 46 and the adder 49 of the controller 40 of the previous embodiment are all omitted. Accordingly, the output signal L of the height sensor 23 in the form of a position sensor is inputted to the current control means 50 and to the low-pass filter 41 where the high-frequency component of the height sensor signal L above a prescribed upper frequency limit is filtered. The output D of the low-pass filter 42 and the output L* of the attitude control means 48 are both inputted to the current control means 50. Thus, the operation of this embodiment is similar to that of the previous embodiment except for the operation of the above elements 44, 46 and 49.

Figure 5:
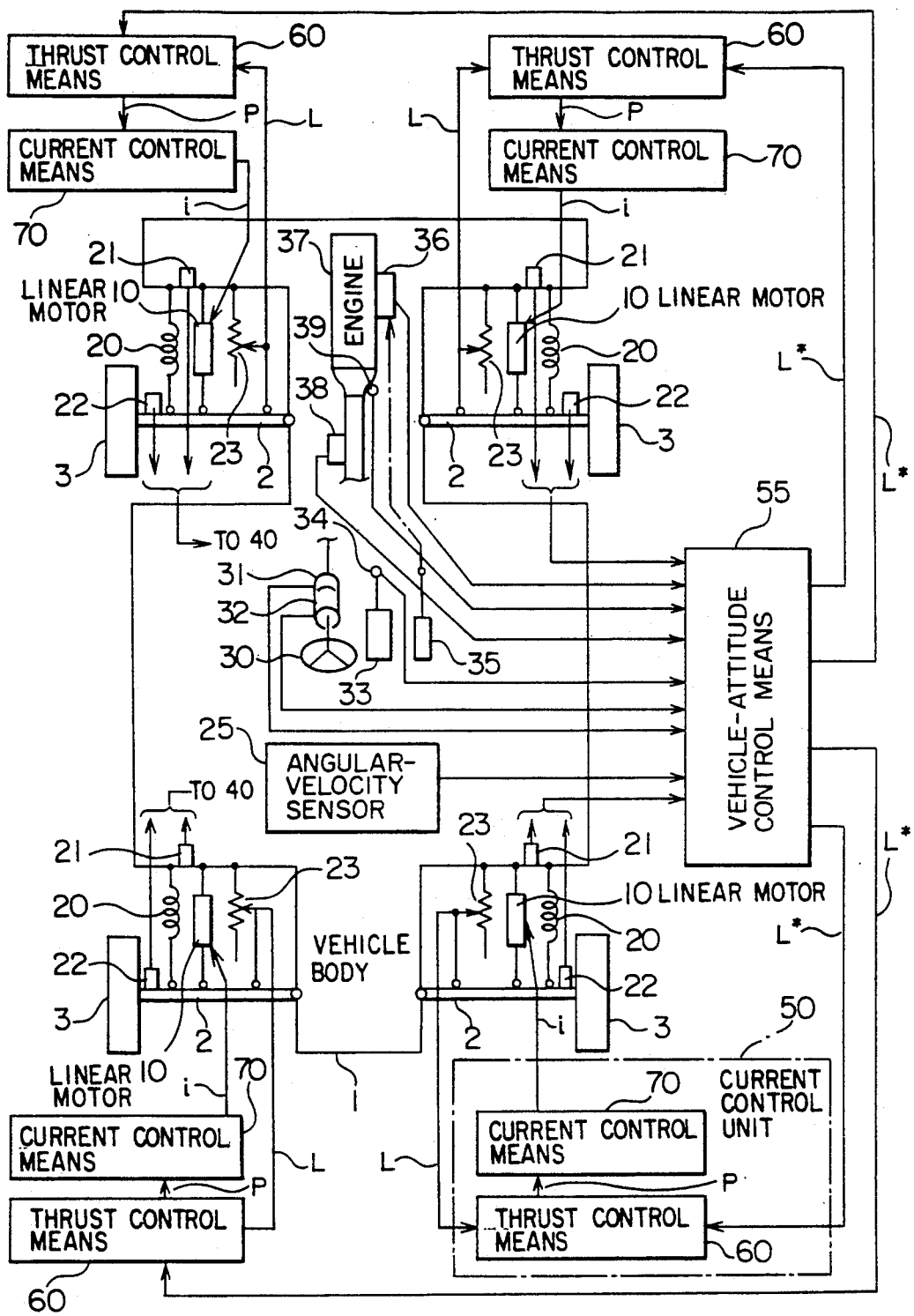
FIG. 5 is a schematic illustration showing the general arrangement of a suspension apparatus for a vehicle in accordance with a third embodiment of the present invention.
Figure 6:
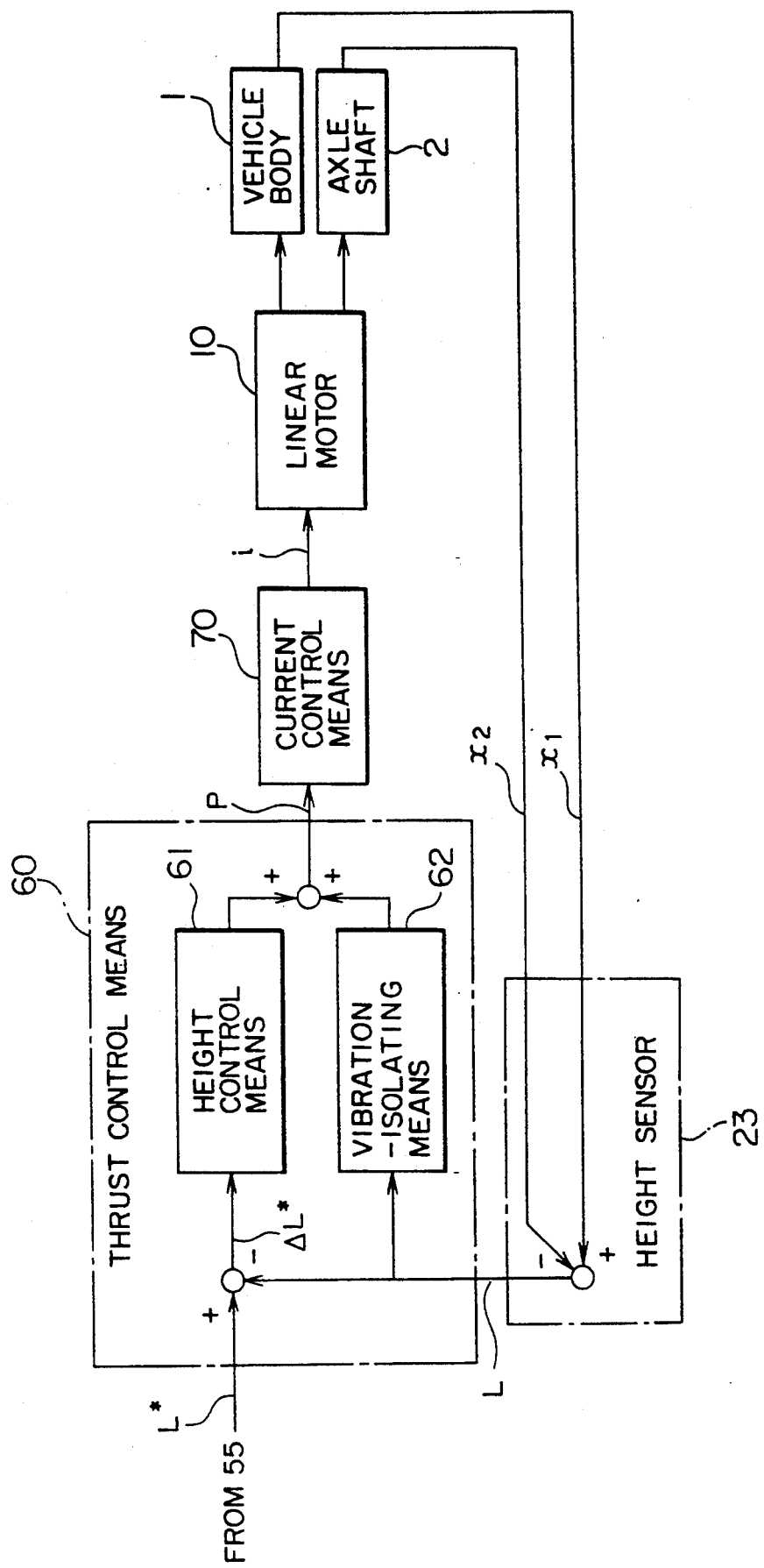
FIG. 6 is a block diagram of a controller for controlling the linear motors of FIG. 5.
Figure 7:
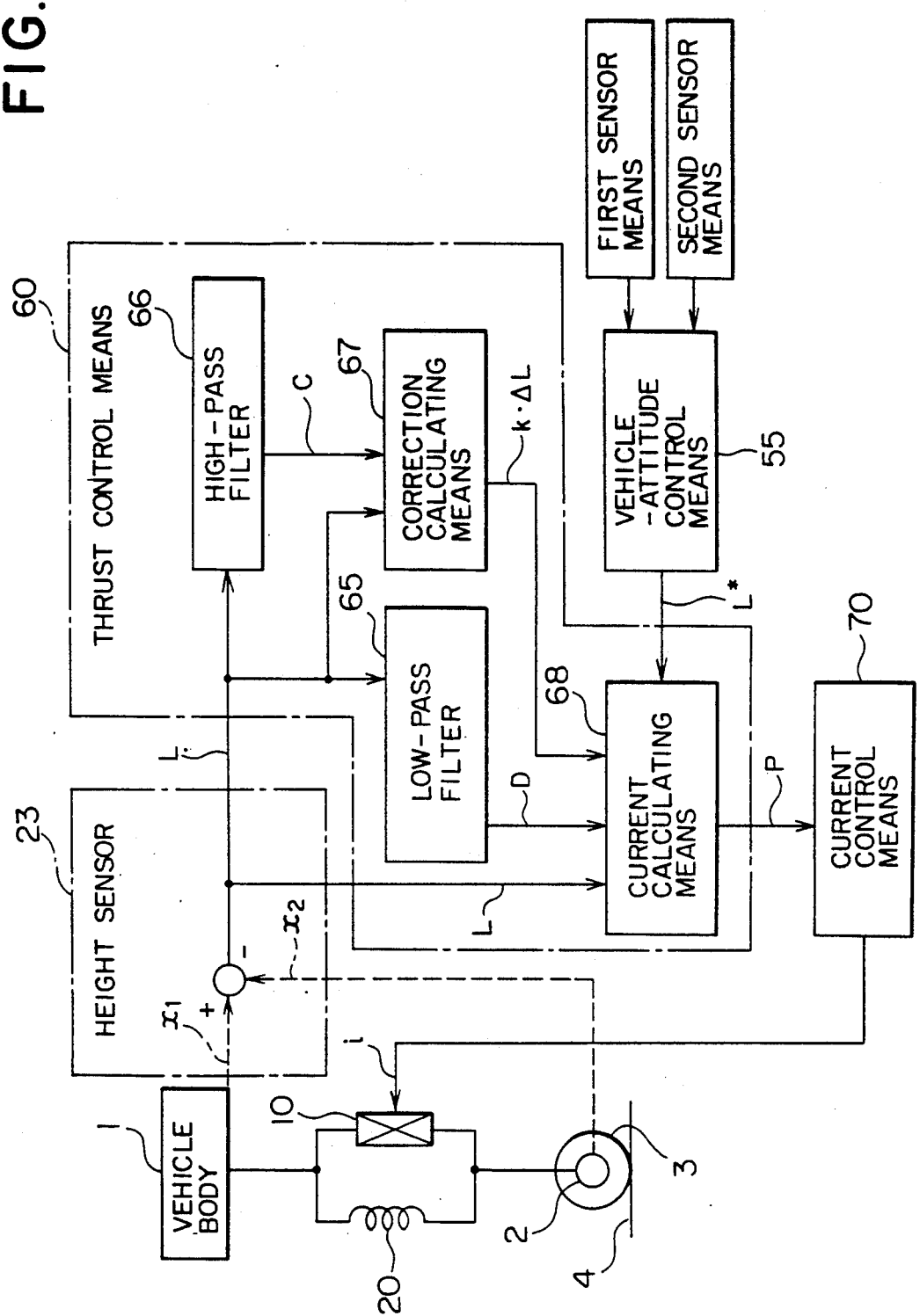
FIG. 7 is a block diagram similar to FIG. 6, but showing a fourth embodiment of the present invention.
Figure 8:
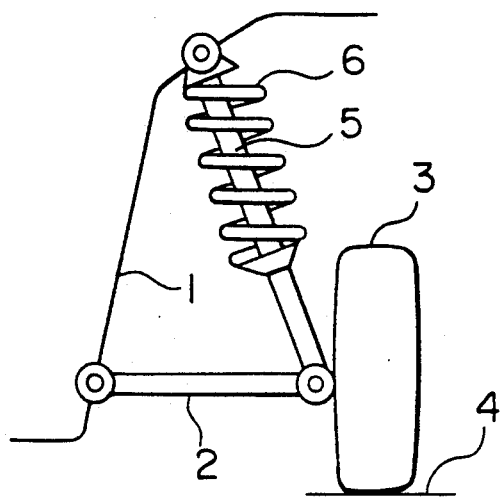
FIG. 8 is a schematic view showing a conventional support apparatus in the form of a vehicular suspension apparatus.
Figure 9:
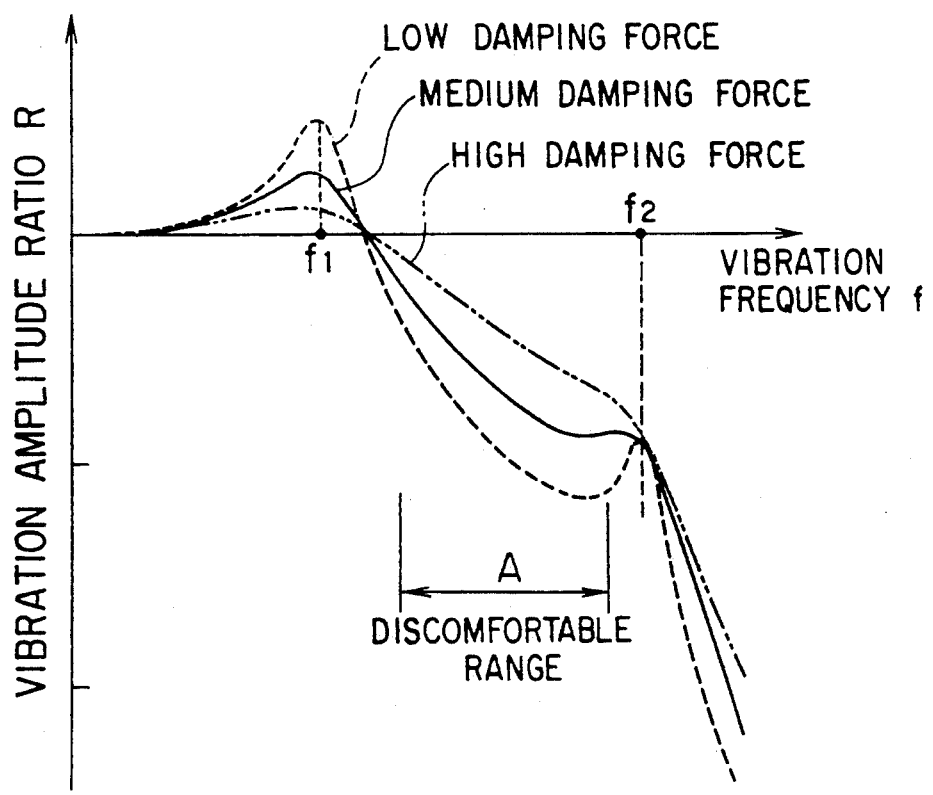
FIG. 9 is a graph showing the operational characteristic of a shock absorber employed with the conventional suspension apparatus of FIG. 8 with its damping force changed into three different levels.

FIGS. 5 through 7 show a third embodiment of the present invention. This embodiment is substantially similar in construction and operation to the first embodiment of FIGS. 1 through 3 except for the following features. In this embodiment, the controller 40 of FIG. 3 comprises or is replaced by a single vehicle-attitude control means 55 for controlling the attitude of the vehicle, i.e., generating vehicle-attitude control signals L* representative of a target attitude of the vehicle body 1 based on the output signals from the first and second sensor means, and a plurality of thrust control means 60 for controlling the thrust or operating force of each linear motor 10 based on the output signals L, L* from the height sensors 23 and the vehicle-attitude control means 55. The vehicle-attitude control means 55 and the thrust control means 60 are separately formed from each other.

As shown in FIG. 6, each of the thrust control means 60 comprises a height control means 61 for calculating, based on the output signals L, L* of a corresponding height sensor 23 and the vehicle-attitude control means 55, an appropriate thrust of each linear motor 10 so that the heights of the vehicle body 1 relative to the respective road wheels 3 are controlled by the linear motors 10 to maintain the vehicle attitude at the target attitude, and a vibration-isolating control means 62 for calculating, based on the output signal L of a corresponding height sensor 23, an appropriate thrust for each linear motor 10 so that the high-frequency vibrations of each road wheel 3 are offset by the corresponding linear motor 10 to isolate the transmission of the vibrations to the vehicle body 1.

The height control means 61 comprises a high-pass filter 66 for filtering low-frequency components of the output signal L of a corresponding height sensor 23 below a prescribed lower frequency limit, and a correction calculating means 67 for calculating, based on the output signal C of the high-pass filter 66, a correction $k \times \Delta L$ for offsetting a change in the operating force of a corresponding elastic member 20.

The vibration-isolating means 62 comprises a low-pass filter 65 for filtering high-frequency components of the output signal L of the corresponding height sensor 23 above a prescribed upper frequency limit. The low-pass filter 65, the high-pass filter 66 and the correction calculating means 67 of this embodiment, are similar in operation to the elements 42, 44, 46 of FIG. 3.

The thrust control means 60 further includes a current calculating means 68 for calculating, based on the output signals L*, L, $k \times \Delta L$ and D of the vehicle-attitude control means 55, the height sensor 23, the correction calculating means 67 and the low-pass filter 65, control current values P representative of currents which are respectively supplied to the linear motors 10, the current calculating means 68 being operable to output the control current values P to respective current control means 70. Based on the output signal P from a current calculating means 68, a corresponding current control means 70 controls the current supply to a corresponding linear motor 10.

Thus, in this embodiment, since the thrust control means 60 is formed separately or independently of the vehicle-attitude control means 55, the vehicle-attitude control means 55, which calculates a target vehicle attitude based on the driving conditions of the vehicle, needs only to respond to the vehicle driving conditions but does not have to have a high-speed or quick response. In contrast, the current calculating means 68, which calculates the control signal P representative of a current i supplied to a corresponding linear motor 10, is required to have a high-speed response since it must respond to variations in the relative vehicle height L (i.e., high-frequency oscillations) as well as the dynamic conditions of the vehicle body 1. Accordingly, the thrust control means 60 requiring high-speed response is constructed separately from the vehicle-attitude control means 55 such that it calculates the control signal P based on the actual relative vehicle height L as detected in a real-time fashion and the target vehicle height L* as determined from slightly belated past data. In addition, the thrust control means 60 can be constituted by an analog amplifier instead of a digital signal calculating means.

In this regard, however, the thrust control means 60 and the vehicle-attitude control means 55 may be constituted by a one chip control unit if it has adequate calculation performance.

Although in the above embodiments, the linear motors 10 are of a voice coil type, other types of linear motors such as, for example, an induction motor having a multi-phase primary winding may be utilized.

Also, each height sensor 23 is in the form of a potentiometer which senses the relative vehicle height or distance L between a specific portion of the vehicle body 1 and an axle shaft 2 based on the amount or distance of the movement of the corresponding linear motor 10, i.e., the relative displacement of the slide member with respect to the stator. However, instead of such a type of potentiometer, another type of height sensor can be employed such as the one mounted on the vehicle body 1 for sensing the relative vehicle height L by directly measuring the heights of the vehicle body 1 and an axle shaft 2 from ground.

Further, although each linear motor 10 is disposed such that the stator thereof is connected with the vehicle body 1 and the slide member thereof is connected with an axle shaft 2, such a disposition can be reversed.

In the above-described embodiments, the support apparatuses of the present invention are applied to the suspension apparatuses for a vehicle for dampingly supporting the vehicle body on road wheels, but in a broader and more generalized sense, it can also be utilized for dampingly supporting an object on a support. In this case, the vehicle body and the road wheel can be the object and the support, respectively.

What is claimed is:

1. A support apparatus for dampingly supporting an object on a support member, said support apparatus comprising:
    a linear motor disposed between said object and said support member for telescopically supporting said object under magnetic effects, said linear motor having a stator member and a movable member which is movable relative to said stator member, said movable member being magnetically connectable with said stator member, one of said stator member and said movable member being connected to said object, the other of said stator member and said movable member being connected to said support member;
    a position sensor for sensing the position of said object relative to a reference position and generating an output signal representative of the sensed relative position of said object;
    height control means including a low-pass filter, coupled to said position sensor, for filtering high-frequency components of the output signal of said position sensor that are above a prescribed upper frequency limit;
    vibration isolating means including a high-pass filter, coupled to said position sensor, for filtering low-frequency components of the output signal of said position sensor that are below a prescribed lower frequency limit;
    sensing means for sensing various conditions of said object;
    attitude control means, responsive to said sensing means, for calculating a target object height or attitude; and
    current control means, coupled to said height control means, vibration isolating means, and attitude control means, for controlling, based on output signals of said low-pass filter and high-pass filter, the current supply to said linear motor in such a manner as to offset a change in said output signal of said low-pass filter so as to maintain said target object height or attitude, and a change in said output signal of said high-pass filter so as to compensate for non-controlled high-frequency vibrations of said object.

2. A support apparatus for dampingly supporting an object on a support member, said support apparatus comprising:
    a linear motor disposed between said object and said support member for telescopically supporting said object under magnetic effects, said linear motor having a stator member and a movable member which is movable relative to said stator member, said movable member being magnetically connectable with said stator member, one of said stator member and said movable member being connected to said object, the other of said stator and said movable member being connected to said support member;
    an elastic member disposed between said object and said support member in parallel with said linear motor for elastically supporting said object on said support member;
    a position sensor for sensing the position of said object relative to a reference position and for generating an output signal representative of the sensed relative position of said object;
    a low-pass filter for filtering high-frequency components of the output signal of said position sensor above a prescribed upper frequency limit;
    a high-pass filter for filtering low-frequency components of the output signal of said position sensor below a prescribed lower frequency limit;
    correction calculating means for calculating, based on the output signal of said high-pass filter, a correction for offsetting a change in the operating force of said elastic member; and
    current control means for controlling the current supply to said linear motor based on a change in the output signal of said low-pass filter and the correction calculated by said correction calculating means.

3. A suspension apparatus for a vehicle for dampingly supporting a vehicle body on a road wheel, said suspension apparatus comprising:
    a linear motor disposed between said vehicle body and said road wheel for telescopically supporting said vehicle body under magnetic effects, said linear motor having a stator member and a movable member which is movable relative to said stator member for telescopic movement, said movable member being magnetically connectable with said stator member, one of said stator member and said movable member being connected to said vehicle body, the other of said stator and said movable member being connected to said road wheel;

an elastic member disposed between said vehicle body and said road wheel in parallel with said linear motor for elastically supporting said vehicle body on said road wheel;

first sensor means for sensing the various dynamic conditions of said vehicle body comprising a height sensor for sensing the height of said vehicle body relative to said road wheel;

second sensor means for sensing the various operating conditions of said road wheel; and control means for controlling the current supply to said linear motor based on the output signals from said first and second sensor means in such a manner that said linear motor operates to isolate the transmission of high-frequency vibrations of said road wheel to said vehicle body while maintaining the height of said vehicle body at a target level, said control means comprising:

a low-pass filter for filtering high-frequency components of the output signal of said height sensor above a prescribed upper frequency limit;

a high-pass filter for filtering low-frequency components of the output signal of said height sensor below a prescribed lower frequency limit;

correction calculating means for calculating, based on the output signal of said high-pass filter, a correction for offsetting a change in the operating force of said elastic member;

attitude control means for calculating a height control value representative of a target vehicle height based on the output signals from said first and second sensors means;

an adder for adding the correction from said correction calculating means and the height control value from said attitude control means, and generating an output signal representative of the result of the addition; and current control means for controlling the current supply to said linear motor based on the output of said low-pass filter, the output of said adder and the output of said height sensor.

4. A suspension apparatus for a vehicle for dampingly supporting a vehicle body on road wheels, said suspension apparatus comprising:

a plurality of linear motors each disposed between said vehicle body and one of said road wheels for telescopically supporting said vehicle body under magnetic effects, said linear motor having a stator member and a movable member which is movable relative to said stator member for telescopic movement, said movable member being magnetically connectable with said stator member, one of said stator member and said movable member being connected to said vehicle body, the other of said stator and movable member being connected to said corresponding road wheel;

a plurality of elastic members each disposed between said vehicle body and one of said road wheels in parallel with a corresponding one of said linear motors for elastically supporting said vehicle body on the corresponding road wheel;

a plurality of height sensors provided one for each road wheel for sensing the height of said vehicle body relative to the corresponding road wheel;

first sensor means for sensing the dynamic conditions of said vehicle body;

second sensor means for sensing the various operating conditions of the vehicle; and vehicle-attitude control means for generating, based on the output signals of said first and second sensor means, vehicle-attitude control signals representative of a target attitude of said vehicle body relative to said road wheels;

thrust control means for controlling the thrust of each of said linear motors based on the output signals from said height sensors and said vehicle-attitude control means in such a manner that each of said linear motors operates to isolate the transmission of high-frequency vibrations of the corresponding road wheel to said vehicle body while maintaining the attitude of said vehicle body at the target attitude; and current control means for controlling the current supply to said respective linear motors based on the output signals from said thrust control means.

5. A suspension apparatus for a vehicle as claimed in claim 4, wherein said thrust control means comprises:

height control means for calculating, based on the output signals of said height sensors and said vehicle-attitude control means, an appropriate thrust of each linear motor so that the heights of said vehicle body relative to said respective road wheels are controlled by said linear motors to maintain the vehicle attitude at the target attitude; and vibration-isolating control means for calculating, based on the output signals of said height sensors, an appropriate thrust for each linear motor so that the high-frequency vibrations of each road wheel are offset by the corresponding linear motor to isolate the transmission of the vibrations to said vehicle body.

6. A suspension apparatus for a vehicle as claimed in claim 5, wherein said vibration-isolating means comprises:

a high-pass filter for filtering low-frequency components of the output signal of each height sensor below a prescribed lower frequency limit; and correction calculating means for calculating, based on the output signal of said high-pass filter, a correction for offsetting a change in the operating force of each elastic member.

7. A suspension apparatus for a vehicle as claimed in claim 5, wherein said height control means comprises a low-pass filter for filtering high-frequency components of the output signal of each height sensor above a prescribed upper frequency limit.

8. A suspension apparatus for a vehicle as claimed in claim 4, wherein said thrust control means comprises:

a high-pass filter for filtering low-frequency components of the output signal of each height sensor below a prescribed lower frequency limit;

correction calculating means for calculating, based on the output signals of said high-pass filter and each height sensor, a correction for offsetting a change in the operating force of each elastic member;

a low-pass filter for filtering high-frequency components of the output signal of each height sensor above a prescribed upper frequency limit; and current calculating means for calculating, based on the output signals of said vehicle attitude control means, said height sensors, said correction calculating means and said low-pass filter, control current values representative of currents which are respectively supplied to said linear motors, said current calculating means being operable to output the control current values to said current control means.

* * * * *